United States Patent [19]

Lemelson

[11] Patent Number: 5,260,837
[45] Date of Patent: * Nov. 9, 1993

[54] PORTABLE TELEVISION CAMERA-RECORDER AND METHOD FOR OPERATING SAME

[76] Inventor: Jerome H. Lemelson, Suite 286, Unit 802, 930 Tahoe Blvd., Incline Village, Nev. 89451-9436

[*] Notice: The portion of the term of this patent subsequent to Aug. 5, 2003 has been disclaimed.

[21] Appl. No.: 818,168

[22] Filed: Jan. 8, 1992

Related U.S. Application Data

[60] Division of Ser. No. 325,768, Mar. 20, 1989, abandoned, and a continuation-in-part of Ser. No. 877,319, Jun. 23, 1986, Pat. No. 4,819,101, and a continuation of Ser. No. 516,532, Jul. 25, 1983, Pat. No. 4,604,668, and Ser. No. 209,057, Nov. 21, 1980, abandoned.

[51] Int. Cl.⁵ .............................................. G04N 5/78
[52] U.S. Cl. ................................... 360/35.1; 360/31; 360/72.2; 360/10.3; 358/906; 358/909
[58] Field of Search .................. 358/906, 312, 909; 360/10.1, 35.1, 31, 72.1, 72.2, 10.3

[56] References Cited

U.S. PATENT DOCUMENTS

| | | | |
|---|---|---|---|
| 3,833,758 | 9/1974 | Ferrari | 358/906 X |
| 3,934,264 | 1/1976 | Uemura | 360/101 |
| 3,943,563 | 3/1976 | Lemelson | 360/35 |
| 3,974,522 | 8/1976 | Fukatsu et al. | 360/60 X |
| 4,017,679 | 4/1977 | Kemner | 358/111 |
| 4,057,830 | 11/1977 | Adcock | 358/906 X |
| 4,131,919 | 12/1978 | Heyd et al. | 358/906 X |
| 4,153,927 | 5/1979 | Owens | 362/99 |
| 4,232,329 | 11/1980 | Horak et al. | 358/906 X |
| 4,262,301 | 4/1981 | Erlichman | 360/10.3 |
| 4,368,490 | 1/1983 | Takimolo | 358/906 X |

FOREIGN PATENT DOCUMENTS

46-37339 12/1971 Japan .
54-140543 10/1979 Japan .

Primary Examiner—Andrew L. Sniezek
Attorney, Agent, or Firm—Steven G. Lisa

[57] ABSTRACT

A portable camera and recording device capable of recording motion picture and still image signals on an erasable magnetic tape and, in an embodiment thereof, still images on hard copy as photographic images. A single assembly supports a television camera at one end, a videocassette recorder behind the television camera and an instant photographic camera below or to the side of the television camera. Still and motion picture images of image phenomena recorded as full-frame video picture signals on the magnetic tape and are displayable on a miniature electronic display screen within the housing. Controls on the housing permit select still images of frames of recorded picture information to be selectively displayed on the screen, viewed though an eyepiece and passed through an aperture of an instant photographic camera for photoghica reproduction. Methods for effectively operating the camera and producing magnetic recordings and hard copy recordings are also provided.

42 Claims, 2 Drawing Sheets

FIG. 5

PORTABLE TELEVISION CAMERA-RECORDER AND METHOD FOR OPERATING SAME

RELATED APPLICATIONS

This is a division of application Ser. No. 07/325,768, filed Mar. 20, 1989 abondoned continuation-in-part of copending application Ser. No. 877,319 filed Jun. 23, 1986 (U.S. Pat. No. 4,819,101) as a continuation of Ser. No. 516,532 filed Jul. 25, 1983 (U.S. Pat. No. 4,604,668), a continuation of Ser. No. 209,057 filed Nov. 21, 1980, abandoned.

1. FIELD OF THE INVENTION

The invention is in the field of television signal recording and hard copy reproduction devices which are portable.

2. THE PRIOR ART

The prior art consists of portable television camera-recorder systems involving a number of separate units which are cumbersom or lack versatility. Viewing of recorded pictures and editing is accomplished off line or wherein the methods for effecting same are not efficiently effected. Hard copy of still pictures requires large and expensive equipment separate from the camera and recorder units.

SUMMARY OF THE INVENTION

This invention relates to a portable recording unit containing a television camera, a television signal recorder, a television monitor and manual controls for selectively operating such devices to effect electro-optical scanning of an image field, recording of the image information and monitoring the recorded information. The unit is operable either in a single frame recording mode or a multiple frame or motion picture recording mode whereby either or both types of recording may be effected per se or sequentially with respect to a magnetic recording member, such as a magnetic tape, provided as a recording medium for a recording and playback unit supported within the single housing of the device.

Heretofore, it was known in the art to provide a manually operated portable television camera in one housing, a television tape recorder in another housing located remote from the camera and a battery located in a third housing wherein all three units are interconnected by means of flexible wires. Such an arrangement of components and their connections are quite difficult to handle and operate and are subject to operational breakdown for a number of reasons including the fact that the interconnecting wires may be tensioned during use resulting in disconnections of the couplings between components which may occur when the lines are tensioned.

The instant invention not only provides a unitary portable unit containing a television camera in a single housing, but the unit is so arranged and constructed that the single housing also contains a magnetic tape or card recorder for television signals, a monitor device for viewing the recorded information or the output of the television camera, a battery which may be easily charged while in the housing, and suitable manual controls for properly operating the camera, the recorder and the monitor.

Accordingly it is a primary object of this invention to provide a new and improved television camera-recorder and methods for operating same to record motion and still picture phenomena.

Another object is to provide a television camera-recorder which is portable and hand holdable during its operation and which is defined by a single housing to simplify its handling and operation.

Another object is to provide a television camera-recorder capable of recording both motion picture and still image video signals on an erasable record member and selectively generating hard copy as photographs of select still image signal recordings without resort to an external hard copy device.

Another object is to providea television camera-recorder with an electronic display, such as a cathode ray tube, forming part of a unitary assembly and viewable by an operator of the camera to permit such operator to view the picture information output by the camera or from the recorder as the camera is hand directed and operated.

Another object is to provide a television camera-recorder unit with an electronic display with manually operable means for causing such display to selectively display still picture information which is either output directly from the camera or from the recorder of the unit wherein such unit includes hard copy producing means for providing prints of select images generated on the display.

Another object is to provide a television camera-recorder with an electronic display which is viewable to a person operating the camera and a projection system for projecting still or motion pictures displayed by the display.

Another object is to provide a television camera-recorder in a unitary assembly with a projection optical system for the video signal information output by the television camera.

Another object is to provide a control system for a magnetic recorder employing a single switching device for recording either still image or motion picture image information on a single magnetic recording member in accordance with the manner in which the switching device is actuated.

Another object is to provide a method of operating a magnetic tape recorder to permit it to record either still or motion picture information.

With the above and such other objects in view as may hereinafter more fully appear, the invention consists of the novel constructions, combinations and arrangements of parts, as will be more fully described and illustrated in the accompanying drawings, but it is to be understood that changes, variations and modifications may be resorted to which fall within the scope of the invention as claimed.

In FIGS. 1 to 4 is shown a portable television camera and recording unit 10 having its major components supported within a single box-shaped housing 11 formed with rigid top and bottom walls 12 and 13, side walls 14 and 15, a front end wall 16 and a rear end wall 17.

Supported at the front end of the housing 11 on a shelf 37 extending between the side walls thereof a distance above the bottom wall 13 is a miniature television camera 32 which may be operated to generate monochrome or color television signals on its output. Supported below the camera 32 is a rechargeable battery 22 having terminals 23 for receiving rechargeable electrical energy from the exterior of the housing and connected by wires (not shown) through suitable switches, to be described, to the energizing input of the camera 32 and the other electronic units supported within the housing 11. Supported directly behind the camera 32 is a television recorder 24, such as a television tape recorder having an elongated opening 24A in its side wall for receiving a cartridge or cassette of magnetic tape. The recorder 24 may be a scaled down version of a conventional so called video cassette recorder containing suitable motor driven mechanisms for either recording directly on magnetic tape while it is supported within the cartridge which is inserted into the opening 24A or on such magnetic tape while a portion thereof is removed and wound around a rotating drum containing one or more magnetic recording and reproduction transducers operable to helically scan transverse tracks of the tape as the tape is driven past the drum. Such mechanisms as provided in video cassette recorders such as the so called Betamax produced by the Sony Corporation of Tokyo, Japan, or similar types of video cassette recorders produced, for example, by Sanyo Company, Matsushita Electric Company, and JVC (Japan Victor Corporation) all of Japan, may be employed in the video recorder 24.

Supported behind the recording unit 24 and having a viewing screen 27 is a miniature television monitor 26 which is operatively connected by wires (not shown) and suitable switches, to be described, to both the outputs of the television camera 32 and the recorder 24. Extending forwardly of the housing 11 and optically coupled to the television camera 32 is a suitable camera lens housing 28 containing the necessary lens or lenses for directing light to the electro-optical input of the camera 32.

The housing 11 contains two handles, a rear handle 19 defining a pistol grip and having pivotally mounted near the upper end thereof a trigger actuator 20 which may be finger pivoted in the counterclockwise direction toward the handle 19 to manually close two sets of contacts, one of which sets defines an over eye switch which is operated when the actuator 20 is lightly depressed for controlling the recording of a single frame of television picture information, while the other is operated when the actuator 20 is totally depressed and is employed to effect motion picture scanning and recording as will be described. A second handle 21 is provided near the front end of the housing 11 to permit the housing to be supported by means of both hands and to provide suitable support therefor so as to permit the trigger actuator 20 and other switches to be described to be operated by the fingers of the hand gripping the pistol grip handle 19. Notation 19A refers to the bottom portion of the handle 19 which may include an electrical coupling device for connecting an external source of electrical energy to the camera in the event that the battery 22 is discharged or is not employed.

Figures 1, 3:
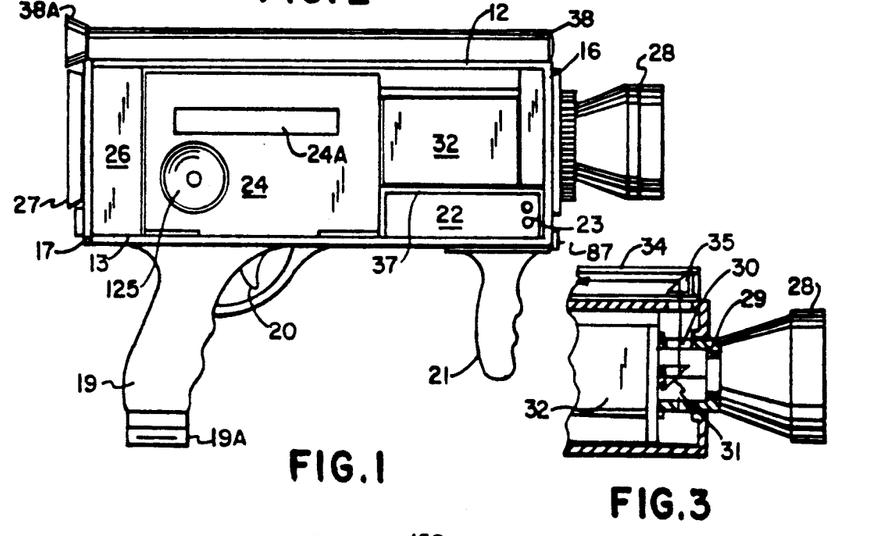
FIG. 1 is a side view with a side wall removed of a portable, hand held television camera, recorder and monitor device.
FIG. 3 is a side view with parts broken away for clarity of a modified form of the device of FIGS. 1 and 2.
Figure 2:
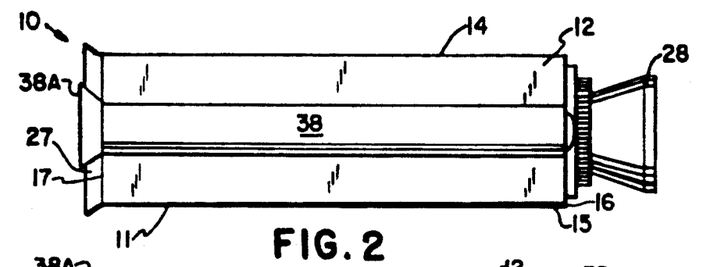
FIG. 2 is a top view of the device of FIG. 1.

Also shown in FIGS. 1 and 2 is an optical system for optically scanning the image information entering the housing 28. Certain details of such optical system are shown in FIG. 3 and include an optical prism 31 which is so arranged as to pass a portion of the entering light upwardly through an opening 30 in a tubular receptacle at the end of the housing 28 and then through a second opening 30 to a second prism 35 which directs the image light pattern along the elongated tubular housing defining unit 38 to a viewing eye piece 38A at the rear end thereof. A portion of the light passed to prism 31 enters the camera 32 where it modulates suitable camera electronics including a read beam containing cathode ray tube or other suitable television scanning means.

Figure 4:
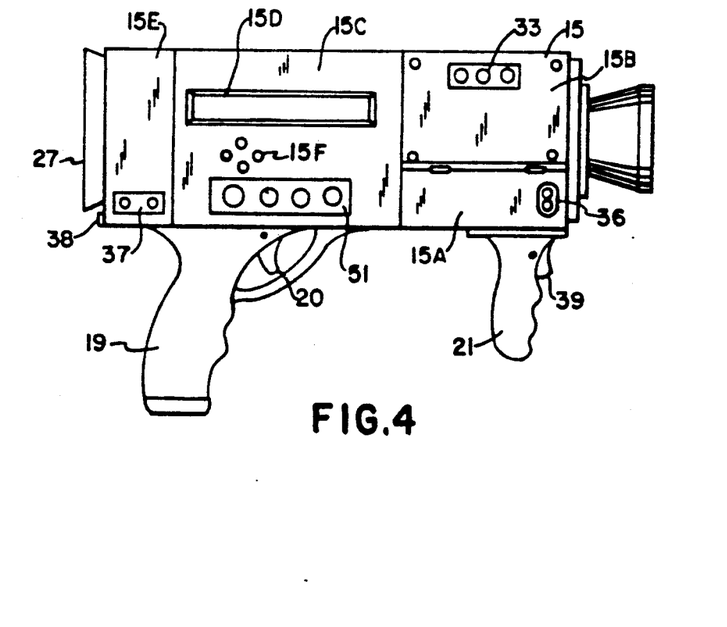
FIG. 4 is a side view of the device of FIG. 1 having certain modifications thereto.

In the embodiment illustrated in FIG. 4, the side wall of the housing 11 is in place and is made up of a number of separately removable or pivotable components including a first hinged section 15A which may be pivoted upwardly or removed to permit access to the rechargeable battery 22 for replacement or inspection thereof. A female receptacle 36 is mounted on the wall section 15A for receiving a plug extending from a suitable battery charging unit for charging the battery.

A wall section 15B is removably mounted on the housing and contains a panel 33 supporting a plurality of controls for adjustably controlling the television camera 32 to vary such functions as brightness, vertical stability, color circuitry, etc.

A third section 15C of the side wall contains an elongated opening 15D therein permitting a magnetic tape cassette or cartridge to be inserted into the housing 11 and passed into the magnetic tape or reproduction unit 24 through the opening 24A aligned with 15D. A plurality of switches 51 are supported on the side wall of the panel 15C and are employed to control recording and reproduction operations as will be described.

A fourth panel 15E, also removable from the housing 11, forms part of its side wall and covers the monitor unit 26 which may be removed from the housing when the panel 15E is removed. Switches supported by the panel 15E may be easily operated to control the operation of monitor 26 supported immediately behind panel section 15E.

Also illustrated in FIG. 4 is a second trigger actuator 39 supported by the front handle 21 which may be employed to operate one of the control switches described hereafter. For example, when actuator 39 is manually squeezed or pivoted, it may be employed to close a switch for effecting the recording of a single frame television picture signal on the magnetic recording member of the recording unit 24. Actuator 20, when depressed, may be employed solely to close a switch for effecting motion picture signal recording on the recording member of the recorder-reproduction unit 24. Either actuator may also be employed to provide for instant playback of recorded information, when manually depressed.

It is noted that the recorder and reproduction unit 24 may also comprise a magnetic card recorder-reproducer device of the types defined in U.S. Pat. Nos. 3,943,563; 3,803,350 or 3,818,500 or of the type manufactured by the Sony Corporation of Tokyo, Japan under the trade name Mavica as described in the November/December 1975 issue of Video System Magazine. If such a magnetic card recorder/reproducer unit is employed in the location shown in FIG. 1, the openings 24A and 15D in the side wall of the housing 11 would be narrow enough to accommodate and guide a suitable magnetic card inserted therein by hand into the recorder housing wherein it may be power driven by suitable rollers to an operative location for video signal recording and/or reproduction scanning as described. Such movement into the recorder housing may be effected automatically when a sensor senses the leading edge of the magnetic card and controls a drive motor, or in response to the operation of a manual control switch located on the side wall of the housing 11. Single and/or motion picture frames of full frame video picture signals may be recorded with locating codes on the face if the magnetic card containing the magnetic recording material.

Also shown in FIG. 1 is a microphone 87 supported at the front end of the housing 11 adjacent the battery 22. The microphone 87 may also be supported on an extendable or folding arm on the outside of the housing for picking up sounds to be recorded along with video motion picture recordings as will be described. A loud speaker 125 is shown supported by the video recorder 24 facing one side of housing 11 and openings 15F are provided in the side wall portion 15C to permit sound from the microphone to be heard exterior of the housing 11.

ELECTRONIC CONTROL SYSTEM

Figure 5:
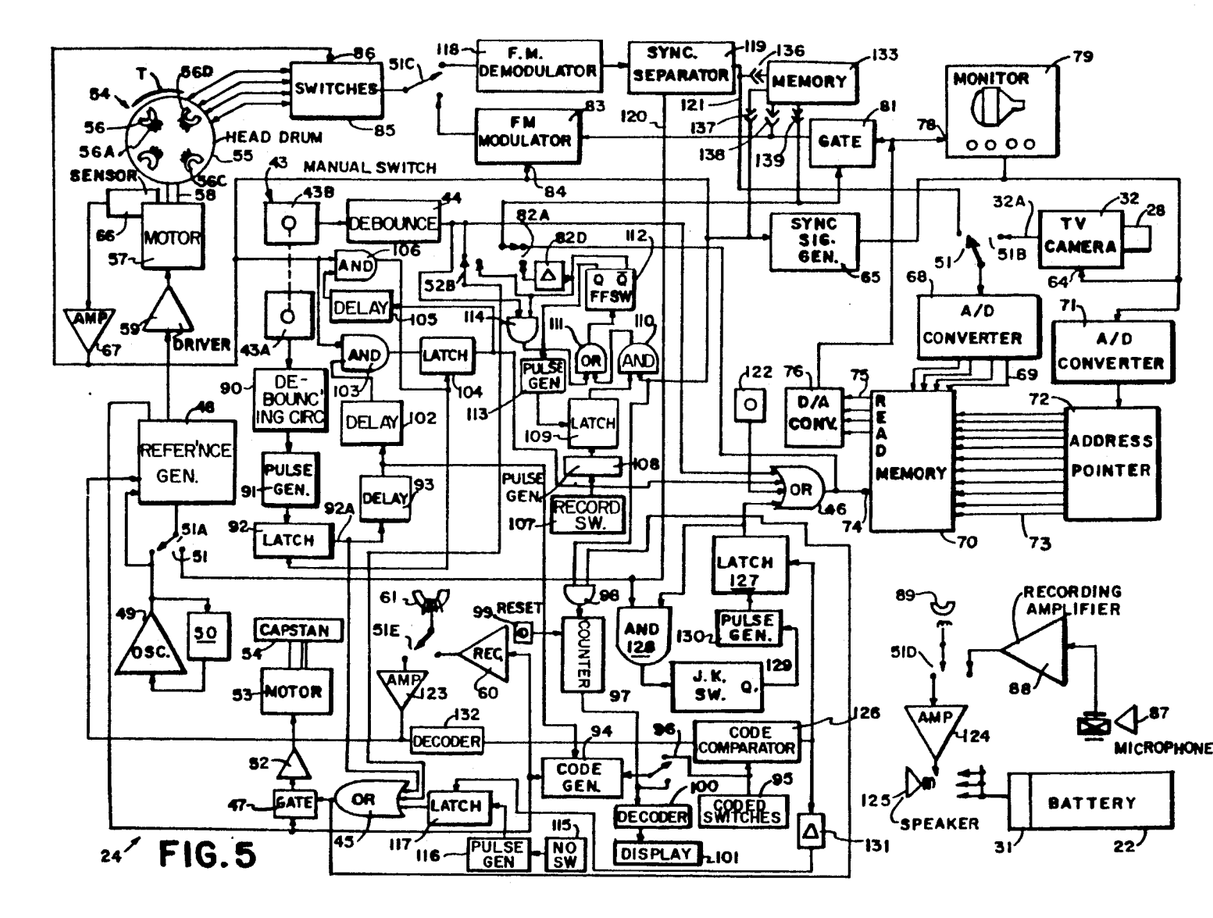
FIG. 5 is a schematic diagram showing components of the camera device of FIGS. 1 and 4 for electrically controlling the operation thereof in a plurality of different modes of operation.

In FIG. 5, the control system for the camera recording unit 10 includes a normally open manual switching means 31 which is operated, per se or, when the trigger 20 is manually depressed which gating from the battery or power supply 22 which may comprise a rechargeable battery as described, to all active circuits in the system 30 for all modes of operation which will be described. The television tape recording and playback unit 24 may be of the helical tape scanning type employing such constructional details as provided in such U.S. Pat. Nos. 2,998,495; 3,404,241; 3,397,783; 3,051,777; and 3,803,350.

The magnetic tape or card recording unit 24 receives the television signal or signals generated on the output of camera 32 which signals are converted to frequency modulated signals which are applied to one or more magnetic recording heads denoted by the general notation 56 supported by a rotating drum 55 wherein the rotating heads scan, in a so called helical scanning operation, transverse tracks of a magnetic tape supported within and supplied by a cartridge or cassette inserted into the opening 15D in the side wall of the housing of the portable unit 10. One or more stationary magnetic heads 89 are also provided for recording audio information received from a microphone 87, along one or more audio tracks and one or more stationary pulse or code recording heads 61 are provided to record coding information along a code track or tracks of the magnetic tape or card.

The trigger actuator 20 located adjacent the handle 19 is mechanically connected to a normally open multiple-pole switch 43 which is provided with two switching positions or contact pairs, one of which, denoted 43A, is operable to effect control of the television camera 32 in a manner to cause it to full-frame sweep its image field one complete cycle while attainment of the second switching position or contact closure as defined by section 43B of the switch 43 results in operation of the television camera 32 in a continuous manner to continuously generate and output television picture signals as long as the contacts of switch section 43B are closed.

When the trigger actuator 20 is slightly depressed, the contacts of switch section 43A are closed while the contacts of section 43B remain open. When trigger actuator 20 is firmly depressed, the contacts of switch section 43A are closed which activates a switch debounce circuit 44 energizing an OR gate 45 and a second OR gate 46. OR gate 45 activates a transmission gate 47 passing motor drive signals from a reference generator 48, which is synchronously locked to an oscillator 49 having a crystal feedback means 50 for stability and accuracy, through a single pole double throw switch 51A forming part of a multiple-switch assembly 51 which is employed to effect either a playback or recording operation, said motor drive signals being thereby gated to a motor drive circuit 52 controlling a synchronous motor 53 which drives the tape capstan wheel 54 advancing and driving the magnetic recording tape T past a record playback head assembly 54. The record playback head assembly 54 contains several magnetic record-playback heads denoted 56A, 56B, 56C, 56D, or a single head depending on the manner in which the magnetic recorder is designed and the head or heads are supported by a drum which rotates on a shaft 58 driven by a high speed motor 57 which is synchronized to the output of the reference generator 48 through motor drive circuits 59.

The output of reference generator 48 is also connected to circuitry 60 defining control track recording electronics which controls the motor 57 and the recording of the output signals of the reference signal generator 48 on a control signal recording track of the tape so as to be available, when reproduced therefrom to effect playback synchronization.

The visual or image information signals to be recorded on the tape are derived by the electro-optical scanning means of the television camera 32 as received through the camera lens 28 and are generated as full-frame video picture signals on the output 32A of the camera which signals are intensity modulated in accordance with the brightness features of the image field which is electronically scanned by the read-beam or other scanning means of the camera. The horizontal and vertical synchronization signals which are utilized to control the sweep of the read-beam or flying spot scanner of the camera 32 are applied to the read-beam control input 64, are derived from a sync signal generator 65 and are synchronized to the rotational movement of the magnetic head assembly by means of signals generated by a rotational position sensor 66 which may comprise a photoelectric, electro-mechanical or other form of sensor sensing the rotation of the shaft 58 of the motor 57 driving the drum 55 containing the magnetic transducing head or heads 56. The sensing signals so generated are amplified in an amplifier 67. The full-frame video picture signals generated on the output of the television camera are passed to an analog-to-digital converter 68 through the contacts 51B of the single hole double throw switch 51 described and the output of the converter 68 is presented as a digital code representing the brightness and color value associated with the video signal output of the camera which code signals are passed to the write-inputs 69 of a full-frame memory device 70. The sweep signals generated by sweep signal generator 65 are input to an analog-to-digital converter 71, the output digital signals of which are passed to an address pointer 72, the outputs 73 of which are applied to selectively activate the proper locations of the memory 70 for recording the brightness levels of the digitized video picture signal elements presented on the outputs 69 of the analog-to-digital converter 68 when a write-enable input 74 for the memory 70 is activated.

The memory 70 is continuously swept by the address pointer 72 in synchronization with the movement of the head assembly 55. The signals generated on the read-outputs 75 of the memory 70 thus continuously represent the information content of the memory 70. The output signals are passed to a digital-to-analog converter 76 on the outputs 75 and the output of the converter is generated as analog video signals which are passed to the input 78 of a video monitor 79 such as a cathode ray tube or other form of electronic display for displaying the information recorded in the memory.

The write-enable input 74 of the memory 70 is activated by the output of an OR gate 46 when the contacts of switch section 43B are closed as described.

OR gate 46 also activates a transmission gate 81 when a manually operated single pole double throw switch 82A is closed, passing the video signal generated on the output of the digital-to-analog converter 76 to an F.M. modulator 83 which conditions the video signal for recording by combining it with the sync signal generated on the output of amplifier 67 which is passed to the input 84 of the modulator 83. A manually operable double throw switch 51C is employed to connect the recording heads 56 to the output of the modulator 83 while the output of the amplifier 67 is connected to an input 86 of an electronic switch 85 which is operable to connect the appropriate head 56 of the bank of heads 56A-56D in timed synchronization to the output of the F.M. modulator 83 and the amplifier 67 to effect the proper recording of the video picture signals on respective transverse tracks of the tape as it is driven around the rotating head assembly.

An audio signal of sounds generated in the vicinity of the camera may be recorded in the conventional manner by gating the output of a microphone 87 to a proper recording electronic circuit 88 through a manually operated single pole double throw switch 51D which is connected to an audio record-playback head 89 which is stationarily supported in the recorder to record along an audio track extending parallel to the longitudinal axis of the magnetic tape. The operations described above essentially define recording and playback for the motion picture mode of recording operation of the apparatus 10.

SINGLE FRAME RECORDING

In order to effect single full-frame video picture signal recording of information derived from the television camera the following operational functions are noted. The finger operated trigger actuator 20 for the manually operated switch 43 is slightly depressed which activates the normally open switching section 43A thereof activating a switch debouncing circuit 90 which causes a pulse generator 91, such as a monostable multivibrator, to set the latch 92 of the switch as a result of generating a very short pulse each time switch 43A is so activated. The output of the latch 92 is applied to an input of OR gate 45 resulting in the subsequent controlled operation of the tape drive motor 53 which drives the tape capstan 54 and any other mechanism necessary to effect tape drive movement against or around the head drum as previously described.

The output 92A of the latch 92 becomes energized and the signal so generated is passed to activate a code generator 94 after being delayed by means of a time delay circuit 93 for a sufficient time interval to permit the tape drive motor 53 to start up and attain operating speed. The code generator 94 generates a unique code which is determined either by the manual operation of a bank of coded switches 95, for example by employing thumb wheel BCD switches, such activation occurring when a single pole double throw manual switch 96 is in its manual operational position as shown or when said switch 96 is in its automatic operational position and is connecting a counter circuit 97, which accumulates one count each time the clock is pulsed by AND gate 98 to said code generator 94. The output of the AND gate 98 is activated every time a signal is present on both its inputs, one of which inputs is connected to receive the sync signal generated on the output of amplifier 67 for the motion picture mode of operation and the other to the output of the OR gate 45 which is activated when it is desired to effect video signal recording in either the motion picture or single frame recording modes. The counter 97, which accumulates one count for each frame actually recorded, may be reset by means of a reset switch 99, which may be manually operated and-/or automatically operated as a limit switch when engaged by a portion of the housing of the magnetic tape cassette or magnetic card inserted into the housing of the recorder-playback unit.

The output of counter 97 is connectable, in addition to the code setting input of the code generator 94, to a decoder-driver circuit 100 through switch 96 to provide a display of the count on a display means 101, such as a light emitting diode, liquid crystal diode, or other form of digital display which is connected to the decoder-driver circuit 100 and which provides a visual indication of the frame number being recorded. The output of the code generator 94 is a digital code signal which is in a form to be immediately recorded by head 61 on the control track of the magnetic tape or card along with the synchronization control signals as described, without interference to the operations effected by means of said control signals.

Time delay circuit 93 also is employed to activate a further time delay circuit 102 providing a time delay which is sufficient for the recording of the code generated just prior to the generation of the full-frame video picture signal which is associated with said code. The time delay circuit 102 has an output which extends to one input of an AND gate 103. The other input to AND gate 103 extends from the output of sync signal amplifier 67. When both inputs to gate 103 are energized, a signal is generated on the output of the gate which sets a latch 104 which, in turn, activates an input of OR gate 46 energizing the enabling circuit 74 for the memory 70 during operation of the unit in the motion picture mode. The latch 104 is also employed to activate a time delay circuit 105 having a delay which is slightly longer than the duration of the sync pulse derived from the amplifier 67. Delay circuit 105 is connected to one input of an AND gate 106. The other input to AND gate 106 is derived from the output of sync amplifier 67. When the AND gate 106 becomes energized, it passes a signal on its output which is generated after the first sync pulse indicating the beginning of the next recorded frame and thereafter generates a second sync pulse indicating the end of the recording frame, which second signal serves as a reset signal to reset both latches 92 and 104 thereby conditioning the system to properly effect the recording of the next frame and deactivating the OR gate 46 and the enabling input 74 to the memory so as to hold the frame information just generated within the memory 70 until the next frame is presented thereto or, in the single frame recording monitoring mode, until the energizing power to the memory is removed or deactivated.

Provision is also made in the control system illustrated in FIG. 5 to permit the video information generated by the television camera to be previewed on the viewing screen of the monitor before recording such information in the magnetic recorder 24. To effect such previewing, manual switch 82A is operated in a manner to inactivate transmission gate 81 and to prevent the transfer of video picture signals from the digital-to-analog converter 76 to the F.M. modulator 83. Switch 82B, which is mechanically coupled or connected to switch 82A, is also operated to a preview position, disenabling the OR circuit 45 and thereby terminating the passage of motor drive signals to the tape drive motor 53 and preventing the movement of the tape past the heads during the preview operation. If it decided that the visual information presented to the viewing screen of the monitor 79, which is held in memory 70, is to be recorded, a record switch 107, such as a momentary contact normally open switch, is manually depressed which activates a pulse generator 108 which sets a latch 109 which activates one input of an AND gate 110. The AND gate 110 generates a control signal on its output when both its inputs are activated, the other of said inputs extending from the recording amplifier 67. The output of the AND gate 110 is a clock pulse which is passed to an OR gate 111 which is connected to a flip-flop switch 112, the $\overline{Q}$ output of which subsequently becomes activated allowing the tape drive motor 53 to be operated when the OR gate 45 is also activated. The $\overline{Q}$ output of the flip-flop 112 also activates a time delay circuit 82D which, after suitable time delay sufficient to allow the motor 53 to attain running speed from starting and the recording of the frame code as described, activates transmission gate 81 passing the video signals to be recorded therethrough to the recording heads. When the $\overline{Q}$ output is activated, the Q output of the flip-flop switch 112 is inactivated. When the next sync pulse, during the single frame mode of recording, is received from the amplifier 67, the flip-flop switch 112 switches causing the $\overline{Q}$ output to become inactive and preventing the passage of video signals to the modulator 84 and the motor drive signals to the tape motor 53. The $\overline{Q}$ output is then reactivated creating a pulse on the output of a pulse generator 113 which is applied to reset the latch 109 readying it for the next recording cycle. In the motion picture mode, the preview operation may be attained in a manner similar to that in which the preview operation was effected for previewing the single frame output of the video camera with the exception that and AND gate 114 is deactivated by the debounce circuit 44 and the $\overline{Q}$ output of flip-flop switch 112 activates the OR gate 111 preventing a change of state of the input to the flip-flop switch 112 during the changing output of the AND gate 110 until the manual switch 43B is released and inactivates the debounce circuit 44 and also the AND gate 114 so as to allow passage of the next clock pulse from the AND gate 110 through the OR gate 111 to the clock input of the flip-flop 112 when the described toggling and reset functions are effected.

MOTION PICTURE PLAYBACK MODE

The motion picture playback mode may be effected when the switch 51 containing the contact pairs denoted 51A, 51B, 51C and 51D is in the motion picture playback position and the normally open momentary contact switch 115 is actuated without a code being set up in the coded switches 95. The switch 115, when so operated, activates a pulse generator 116 which sets a latch 117 activating OR gate 45 starting the tape drive motor 53 as described. The tape then travels past the record-playback head assembly 54 in a manner to permit the playback head or heads 56 to scan and pick up the recorded signals and to transfer them through the electronic head switching means 85, operating in reverse to the described recording mode, and switch closed 51C to the F.M. demodulator 118, the output of which is a composite video picture signal representative of the composite video picture signal recording so reproduced, which composite signal is fed to a sync separator 119 which serves to separate the sync signals from the composite video signal and present same on an output 120 while the video picture signal elements separated from the reproduced composite video picture signal are passed on a second output 121.

The sync signals generated on the output 120 are passed to the reference generator 48 through switch 51A and define the means whereby synchronization is effected between the movement of the tape and the rotation of the head assembly 54 to insure proper head position with respect to the transverse recording tracks of the tape. The video picture signals generated on the output 121 are transmitted to the analog-to-digital converter 68 and are converted to digital codes representing the brightness and color levels of the picture elements making up the frames of the video information. The write-enabling means is thus continually activated in the motion picture playback mode by the proper operation of a bistable switch 122 through OR gate 46. The operation of the memory 70 and its associated circuitry for controlling the monitor 79 is effected, as described, under the recording mode of operation wherein the output 121 of the sync separator 119 is substituted for the picture signal output of the television camera. In this mode of operation, a control track reproduction head 61 reproduces the recorded signals from the control track of the tape and passes same through a switch 51E to playback amplifier electronic circuitry 123 of conventional design and to the reference signal generator for subsequent application to the tape drive motor 53, as previously described, to maintain the operation of said motor in synchronization with the recordings provided on the tape.

The audio signals generated by the playback circuit of the audio reproduction head 89 in scanning the recordings of the audio track of the magnetic recording member of the recording unit 24 are passed through switch 51D to conventional playback-amplifying electronic circuits 124 to which is connected a speaker 125 supported by the housing 11 of the portable unit 10 to accompany the motion picture video information reproduced from the magnetic recorder and displayed on the monitor.

SELECTIVE SINGLE FRAME PLAYBACK

In order to effect the reproduction of selected full-frame video picture signals from the recording unit 24, a selection code is generated by the selective operation of the bank of code generating switches 95, the output of which extends to a code comparator circuit 126. Switch 115 is manually closed and when the frame location of the magnetic tape containing the selected frame is driven into alignment with the reproduction heads, a decoder 132 senses the code signals reproduced from the frame code recordings on the magnetic tape adjacent the selected frame after they are amplified by means of the control track playback electronic circuitry 123 and when the code so generated matches the code generated on the outputs of the bank of switches 95, the output of the code comparator 126 becomes activated setting a latch 127 which effects energization of the write-enable input 74 to the memory 70, as described, through OR gate 46. The output of latch 127 extends to one input of an AND gate 128, the other input of which extends from the output 120 of the sync separator 119 which is activated with the reproduced video information at the beginning of the reproduction of the recording of the selected full-frame video picture signal causing the AND gate 128 to transfer a clock pulse to the JK or flip-flop switch 129, the output Q of which becomes inactive. Upon the subsequent generation of a sync pulse and its application to the AND gate 128 at the end of the reproduction of the selected frame, said AND gate creates a second clock pulse for the flip-flop switch 129 causing the Q output thereof to be reactivated, which causes a pulse generator 130 to generate and transmit a pulse to the reset input of latch 127, thus deactivating said latch and its control devices (e.g., OR gate 46 and AND gate 128).

Memory 70 and monitor 79 are operated as described for the motion picture mode and the monitor is thus energized to display the selected video picture signal information as a still image on its display screen in accordance with the recording thereof in the memory 70. The code comparator 126, when activated, also operates to reset latch 117 a time delay thereafter as determined by the time delay element or circuit 131 having a delay interval which is sufficient to permit the playback of the entire selected full-frame video picture signal reproduced from the magnetic recorder and said time delay element operates to deactivate the tape drive motor when the selected frame has been reproduced and applied as described. The image information contained in the selected full-frame video picture signal is thus displayed as a still image and may be retained for an extended period of time until another frame of image information is similarly reproduced and applied to the monitor or the motion picture mode of operation is selectively initiated or the power is turned off.

A number of alternative arrangements for the system provided in FIG. 5 are noted. For example, although a four-head magnetic tape recording and reproduction unit is illustrated in the drawings, any other video tape, video card or video disc recording means may be employed embodying suitable circuit and control changes therein as required to effect the described operations. Video picture signal synchronization signals may be derived by means other than that illustrated and described, such as by means of crystal oscillators, electromechanical means, microminiature pulse generating circuits, etc.

Other forms of monitoring devices, such as charge coupled devices, may be utilized to replace the cathode ray tube monitor 79 and should they contain digitizing circuits, it may be possible to eliminate the analog-to-digital and the digital-to-analog devices employed in the circuit diagram so as to simplify the electronic circuitry presented and described.

It is also noted that the memory 70, which is provided herein as a RAM or read-write memory may also comprise any suitable type of memory such as a serial shift register, a charge coupled (CCD) device, a magnetic bubble memory, a rotating disc or drum or any other type of pulse signal storage device capable of storing at least a million bits of full color, high resolution, single frame picture information wherein the appropriate circuit modifications to operate such memory would be provided.

An alternative means for storing single frame video picture signals may comprise a solid state memory 133 which may be connected, as shown, by means of pluggable contacts denoted 136, 137, 138 and 139. For recording, such memory 133 is connected to receive the video signal at the output of transmission gate 81 by means of a plug contact 138. A recording enabling signal may be generated and applied to the memory 133 from the control input to the transmission gate 81 through a contact 139. Synchronization may be provided for the memory by means of the sync signals generated on the output of the amplifier 67 through plug contact 137. Operation may be effected as described.

In order to effect playback of the single frame video picture signal in such a mode of operation, the memory is connected to the socket contacts 136–139. Since the recording input contact 136 is not energized due to the deactivation of the transmission gate 81 no video picture signal will be present at the contact 138 Synchronization may be provided, as described, through contact and the video picture signal output of the memory is passed through contact 136 to the analog-to-digital converter 68, through switch 51B and is thereafter subsequently displayed as in the described reproduction playback mode. In such modes of operation, the memory may retain its information in storage even after the tape is disabled or removed from the unit. Such a memory may comprise a static programmable serial type of memory.

It is noted that the coded switches 95 may include or be replaced by an automatic code generator for generating a different code in a progression of codes to be recorded along with each still picture video signal recorded to permit the selective playback of the video signal from the recorder at a future time as described for selectively viewing the still picture represented thereby.

If switch 51 is operated to gate the output of camera 32 to the A/D converter 68, the video signal information output by the camera may be simultaneously applied to the monitor 79 and the video recorder if switch 51C is switched to the recording mode, thus permitting TV camera operation to be monitored as the camera is operated and its output is recorded.

Modified forms of the apparatus of FIGS. 1–5 are noted as follows:

I. If is desired to transmit the outputs of either or both the television camera 32 and video recorder/reproduction unit 24 to a remote receiver such as a video monitor, a short wave transmitter may be provided in housing 11 and connectable, through suitable manually operate bistable switching means, to either the output of the video recorder 24 or the camera 32 to transmit via short wave to said remote receiver whichever signals are generated by the camera or recorder (e.g.—single full frame video picture signals or motion picture video picture signals). Such signals may be generated as described by the operator of the unit 10 actuating the described switches or, in another mode of operation, generated under remote control by employing a short wave receiver in the housing 11, the output of which is connected to coded relays or logic circuits responsive to respective control codes transmitted thereto from a short wave transmitter at the monitor and generated when the operator thereof selectively closes code generating switches. Transmission of said video signals may also be effected by means of closed circuit television means employing a flexible cable connected to the outputs of the television recorder 24 and camera 32, preferably by being coupled to a connector at the bottom of the handle 19 as described. Remote control of both the camera and recorder 24 as set forth in FIG. 5 may also be effected by direct remote wire connection through said cable to the various control devices described.

II. A magnetic tape, card, disc, solid state or bubble memory recording unit may supplement or replace the unit 24 in the housing 11 and may also be connected as illustrated in FIG. 5 by means of wires extending through a flexible cable to the camera, monitor, battery, microphone, speaker and control switches supported by or within the housing 11. Such recording-reproduction unit may be contained, for example, in a harness or strap held retainer which is held on the belt or shoulders of the operator of the camera and may be operated as described by means of the control switches supported by the housing 11 and/or by means of similar control switches supported by the housing for the recorder and reproduction unit.

III. In yet another embodiment, it is noted that the recorder and reproduction unit 24 supported within the housing 11 may be operable to receive and record single frame and/or motion picture television signals from a remote camera by employing either a short wave receiver for such signals within housing 11 and having its output connected to suitable code responsive controls for the recorder 24 or direct wire connection via cable connected to the handle 19 to said controls.

IV. If the recorder and reproduction unit 24 is a magnetic card reader-reproducer or magnetic disc recorder-reproducer, suitable receiving means for magnetic cards or discs may be employed wherein such record members are inserted into slotted openings in the top wall 12 or either of the side walls of the housing to bring them into operable engagement with mechanisms for conditioning the for recording and reproduction operations as described. Storage space for such cards or discs may be provided in the housing adjacent the battery or recorder 24.

Added to the circuits of FIG. 5 either in parallel with the coded switches 95 or as a replacement therefore may be an automatic code signal generator for generating a progressive binary code each time a single full frame video picture signal is generated by camera 32 and recorded so as to provide a different code recording with each full frame video picture signal recording to permit the selective reproduction of full frame video signals as described.

VI. It is also noted that the camera 32 employed in the hand held unit 10 of FIGS. 1-3 or in a system employing such camera and a separate videocassette recorder connected thereto for recording the output of the camera, may also contain an image converter tube or other form of image converter for convert-video picture signals generated in scanning phenomena at a low light intensity to signals which may be applied in the manner described, to both the visual monitor screen and the recorder unit which signals have been so modified by the image converter that the images generated therefrom may be easily monitored and discerned or studied. Such image conversion means may be employed to provide suitable images during either the single frame recording and monitoring or the motion picture mode of operation of the recorder and monitoring subsystems.

VII. Various videocassette recording and reproduction mechanisms and supporting circuitry as described may be employed in the portable camera, recording and playback unit 10 of FIGS. 1-4. Magnetic recording and playback apparatus found in such videocassette recorder-player units as the Betamax SL-3000 and other videocassette recording units made by Sony Corporation of Tokyo, Japan; the 2200 VCR, the VR 1000 PW and other videocassette recordin units manufactured by Matsushita Electroc Co., Ltd. of Tokyo, Japan; the VP-7300 manufactured by Akai of Japan contain magnetic tape recording and reproduction transducing means and cassette take handling means which may be employed in a unit of the type shown in FIGS. 1-4 and/or modifications thereof.

It should be understood with respect to the circuit diagrams defined in FIG. 5 of the drawings and described above that suitable power supplies having correct polarities and connected to be energized by the described rechargeable battery or a source of line current are provided where not included in the drawings so as to supply proper electrical energy for appropriately operating the various illustrated circuits as described in the specification.

VIII. Photographic or other form of hard copy printing means may be provided within the housing 11 or in a housing which is coupleable thereto for making hard copy or photographic prints of images received either directly from the optical system in the housing 28 or from or from image phenomena and light patterns generated on the video display screen 27 of the television monitor 26. For example, an instant photographic unit, such as a Polaroid Land Camera unit may be provided in the bottom or rear of the housing for the recorder unit 24, below or therebehind or above the housing 11 either as a permanent installation or removably connectable thereto or may be so disposed adjacent a side wall 14 thereof and modified such that its input lens will receive direct or reflected light from the display screen 27, located as shown or facing one of the side walls 14 and 15, or light passed to the optical system in the lens housing 28. In the latter arrangement, suitable prisms, mirrors and lenses may be employed to direct such received light to the input of such photographic camera as may such optical components be used to also direct light from the image screen of the television monitor 26 to such instant photographic camera. A modified instant photographic camera may also be removably attached to or built into the front end of housing 11 for receiving and photographically recording picture phenomena directly from the optical system in housing 28. Its position may be one of those defined by notations 22 and 32 in FIG. 1.

FIG. 5 also shows such an instant photographic camera 80 which may be attached to or supported within housing 11, such as in the subhousings or compartments containing battery 22, the videocassette recorder 24 or defined in part by the side wall 15A. Mechanical or electro-mechanical controls, such as push button or membrane switches, denoted 80C are provided on the side wall of housing 11 or instant photographic camera 80 for manually adjusting camera variables such as aperture speed and opening, one of which push button controls is operable to trigger the shutter of the camera to open and properly close thereafter to take a picture of the image presented to the camera and, if utilized, to close a switch connecting an image intensifying device such as a suitable light source to be described, to a battery such as battery 22 or an auxilliary battery (not shown). Such instant camera operating and adjusting switches 80C are also shown in FIGS. 1 and 4.

In a modified form of FIG. 5, the video monitor which the camera operator views while taking still or motion pictures or playing back same from tape recordings thereof, may be supported within housing 11 and operable to pass light of still or stop-frame images displayed on its screen, simultaneously or sequentially, to either or both eyepiece 38A, through housing 38, and/or to an optical system forming part of a camera assembly 80A which extends across and includes the aperture of the instant camera 80. The video monitor 79 in FIG. 5 is shown as an assembly which includes a video viewing and image generating screen 79S forming part of a device, such as a cathode ray tube (CRT) or a solid state array of charge coupled diodes (CCDs) or the like, in sufficient density to provide a high resolution electronic image of the field scanned by the video camera 10 as such scanning occurs or from signals of recordings derived from the videotape of the video recorder 24 as described. If the image displayed is a still image which is generated on the screen 79S, it may be employed per se or after its intensification as input light to the instant camera for making a photographic hard copy thereof.

Light from the image field light pattern generated on screen 79S of video viewing device 79V may be passed directly to the input 80A of the instant camera 80 to generate a photograph thereof when the instant camera is operated thereafter by the camera operator by depressing the proper switch of switches 80S. Such light from screen 79S may also be directly viewed per se by the camera operator without making a print thereof. In FIG. 5, light from screen 79S is reflected from a mirror or prism 80P and other mirrors or prisms through housing 38 to the eyepiece 38A. If device 80P is a mirror, it may be normally spring biased to reflect light to the eyepiece 38A and eye of the photographer and pivotted or otherwise moved out of the way to allow light to pass directly from the screen 79S directly to the lens and shutter assembly 80A or other opticaly device(s) associated with the instant camera 80 to permit instant photographs to be taken, by manually or motor driving the shutter assembly to open. Thus one of the controls 80C operating the instant camera may mechanically and/or electrically operate both the mirror pivotting and the shutter mechanisms simultaneously or sequentially to permit select pictures to be taken of the images displayed on screen 79S of video display 79.

The instant camera 80 may store and/or immediately deliver each photograph taken, from an end of the camera by the conventional motor driven means of Polaroid type instant cameras or modified forms thereof. If a modified form of such a camera is employed, it may be secured to the bottom wall of housing 11 of the embodiments of FIGS. 1 and 4, as a replacement or support for one of the pistol grips 19 and 21.

Also shown in FIG. 5 is a light source 80L such as a high intensity lamp or lamps or a solid state laser which is energized by an automatic control means, such as a timer or microprocessor, connecting same to a source of suitable electrical energy such as battery 22 or an auxilliary battery (not shown), causing the light thereof to flood and/or scan the screen 79S to provide suitable reflected light to the optical input means of the instant camera 80 for exposing instant photographic sheet material to such light when the aperture opens. Such automatic control means controls the operation of the light source 80L and its scanning means, if used, and the aperture of the camera 80 to permit suitable photographs to me taken of image phenomena displayed on the screen 79S of the display tube or chip 79V.

In a modified form of operation of the invention, electronic display 79V may generate motion picture images output from videocassette recorder 24 when controllably operated in the playback mode, wherein the operator may suddenly stop-frame control the recorder during such playback to capture a select still image on the screen 79S which may be selectively photographed or erased from the screen by the means described. The videocassette recorder may also be operated in a stepping mode wherein select still image recordings of full frame videopicture signals which are digitally recorded on the magnetic tape of the videocassette recorder, may be selectively reproduced therefrom and selectively displayed as still images on the display screen or on an auxilliary display screen such as a large screen television monitor or receiver which is connected, for example, by cable to receive single frame or motion picture signals output by the video recorder 24 during a controlled playback mode of operation. When a still image displayed on such large screen is selected by a person to be photographed, its corresponding image on screen 79S may be photographed as described.

Hard copy producing means other than a Polaroid type instant camera, such as a xerographic unit, may also be provided in a housing located in the bottom of housing 11 or therebelow to receive image field defining light from the video image screen 79S.

IX. By replacing the single mirror or prism 80P shown in FIG. 5 with a movable mirror and optical projection system, the television camera-recorders described above may also be utilized as large screen motion and/or still picture projectors. If the lens assembly 28 contains projection lenses or may be replaced by hand, such as by turning or snap-assembling and removing same from the endwall of the camera housing 11, with such a projection optical lens assembly, image intensified light from screen 79S may be reflected and passed through such projection lens system in housing 28 or an auxilliary housing connected to the camera housing 11 to permit same to be projected and viewed as an enlarged image against a screen or wall a distance from the camera. One or more light sources or lasers 80L may be continuously or pulse operated and/or scanned across screen 79V to provide suitable projection light of the displayed phenomena such as still and motion pictures to be projected. Such light modulated by the images generated on the display screen 79S in its reflection therefrom, may be directed per se through such a projection optical system which is part of or replaces the camera lens assembly 28, may be projected directly onto a wall, projection screen or other means or may be further intensified by directing same against an image intensifying tube or solid state intensifier input operable to provide a new display to a further light projection system operable to project same from the camera against a wall or projection screen.

X. Control of all or certain of the variables associated with the operation of the television camera and the video recorders of the portable television camera-recording apparatus described above may also be effected automatically in response to select words of speech spoken into the microphone 87 by the operator of the camera-recorder unit described. A speech ignal recognition computer, such as the General Instruments Corporation microelectronic chip denoted SP-1000 or speech recognition electronic circuits manufactured by such companies as Threshold Technology Inc. of Delrain, N.J.; Dialog Systems, Inc. of Belmont, Mass.; Scott Instruments, Inc. of Denton, Tex.; Texas Instruments Corp., Dallas, Tex. (using their TNC 0820), etc. may be employed and operatively connected to an analog-to-digital converter connected to the output of microphone 87 or an auxilliary microphone located near the rear end of the housing 11, may be employed which the operator may speak select speech into as he operates the camera-recorder so as to control by means of such select speech such functions as camera focus and zoom, an on-off switch for the camera, an on-off switch for the video recorder, selection of playback or recording functions for the video recorder by operating a bistable switch or selected of a plurality of selection switches, selective playback of selected information such as selected frames of video recordings received by the recorder from the television camera, volume control during recording audio, volume control during playback of audio including the shutting off of audio playback, the control of a motor or motors operating a variable aperture for the camera to selectively and/or incrementally adjust the amount of light entering the camera and others of the controls and switches described above. Manually operable switches and controls for effecting such functions which are speech signal controlled are also preferably provided at the wall(s) of the housing 11 and easily accessible to the fingers of either or both hands of a person operating the camera-recorder. Such speech signal control means may also be employed to control the operation of a hard copy printer, such as an instant camera or xerographic copy making means in the housing to make hard copy of select images derived from the video recorder's memory or tape.

XI. In yet another form of the instant invention, the video cassette magnetic tape recorder units 24 employed in television camera assemblies 10 of FIGS. 1 and 4, may be replaced with erasable laser recording units employing erasable electro-optical recording tapes, cards or discs in which the television picture signals output by the television camera 32 are applied to modulate and operate a scanning beam of a laser in a manner to effect motion picture and/or still picture recordings along one or more record tracks of the tape, card or disc. Selective reading beam scanning playback of the video electro-optical frame recordings so made may be effected by control means and methods described above for one or more of the purposes of directly viewing still and motion pictures on the viewing screen of the camera display 27 and or through the eyepiece 38A receiving light from the screen 79S of the internally mounted electronic image display unit 79.

If a record disc is employed for recording video picture signals and making same available for selective playback, direct and projection viewing as described, it may be supported within a magazine or flat housing which is inserted into and removed from the elongated openings 24A and 15D of FIGS. 1 and 4 or similar openings in the top or bottom walls of the housings 11, wherein the disc hub is available to be engaged by a motor or hand advanced drive shaft of a gear motor in the housing to properly rotate the disc in such magazine for recording and reproduction purposes when scanned with a suitable laser beam from a laser on a pivotted arm which is controllably driven across the disc as it rotates to scan concentric tracks of the disc or a sprial track thereof through an elongated narrow opening in the side wall of the magazine.

XII. In yet another form of the instant invention, the output of the recording amplifier 88 which amplifies audio signals generated by the microphone 87, may be connected through a manual switch controlled by the operator of the television camer-recorder unit 24 to a microelectronic speech signal processing and analyzing computer which is operable to recognize select words of speech received by the microphone and generate respective control signals which are applied, as they are generated, to control one or more of the switching and control functions described above. For example, (a) the television camera 32 may be connected to and disconnected from battery 22, (b) camera output switch 51 may be selectively operated as described by a motor, solenoid or other control means controlled by one or more control signals generated by such speech signal analyzing computer, (c) video recorder control switch 51C may also be selectively controlled by control signals generated by such a speech recognition computer supported within or on housing 11 to selectively record and/or reproduce video picture information signals, (d) the driving means for pivoting mirror 80P for selectively passing the image field light from video monitor screen 79S to the instant camera 80 or the eyepiece 38A, (e) the controls 80C for selectively operating the instant camera 80 may be selectively operated by signals generated by such computer when select speech spoken into the microphone 87 is recognized as may a means for controlling the source 80L of image intensifying or projection light, etc. Additionaly, switches 51D and 51E may be similarly controlled by signals generated by such speech recognition computer when selected speech signals are generated and recognized thereby to further automatically control the operation of the camera-recorder in one or more of the manners described above.

What is claimed is:

1. A hand-held camera and recording apparatus comprising:

a housing;

a camera supported within the housing and having an input for optical image phenomena occurring exterior to the housing, and having means for scanning the image field thereof to generate video picture signals corresponding to scanned image phenomena;

video recording means within the housing for recording and playing back video picture signals;

video monitor means supported by the housing and having a viewing screen for displaying images generated by video picture signals;

preview control means for selectively directing video picture signals generated by the camera to the video monitor means, without also recording the signals on the video recording means, to cause the video monitor means to display images corresponding to image phenomena scanned by the camera;

recording control means for selectively directing video picture signals generated by the camera to the video recording means to cause the recording of video picture signals corresponding to image phenomena scanned by the camera; and playback control means for selectively causing the video recording means to play back previously recorded video picture signals and for directing the played-back video picture signals to the video monitor means to cause the display on the viewing screen of images corresponding to previously scanned image phenomena.

2. The apparatus of claim 1 further comprising: buffer means within the housing for recording video picture signals generated by the camera; and still image control means for selectively recording in the buffer means at least a portion of the video picture signals corresponding to a selected scanned still image phenomenon.

3. The apparatus of claim 2 wherein said still image control means includes means for selectively directing the video picture signals recorded in said buffer means to the video recording means to cause the video recording means to record the video picture signals corresponding to the selected previously-scanned still image phenomenon.

4. The apparatus of claim 3 wherein the still image control means includes means for selectively directing the video picture signals recorded in the buffer means to the video monitor means to cause the display on the viewing screen of the image corresponding to selected previously-scanned still image phenomenon.

5. The apparatus of claim 2 wherein the still image control means includes means for selectively directing the video picture signals recorded in the buffer means to the video monitor means to cause the display on the viewing screen of the image corresponding to selected previously-scanned still image phenomenon.

6. The apparatus of claim 1 wherein the video recording means includes:
a video tape contained within a tape magazine;
motor means for driving the tape within the magazine; and
transducing means including at least one recording head for recording video picture signals on the tape.

7. The apparatus of claim 1 including means for generating the video picture signals as full-frame video picture signals.

8. The apparatus of claim 1 wherein the video recording means is operable to record full-frame video picture signals.

9. The apparatus of claim 2 wherein the buffer means is operable to record a single frame of video picture signals.

10. The apparatus of claim 2 wherein the buffer means is operable to record a plurality of full frame video picture signals.

11. The apparatus of claim 1 further comprising gripping means secured to the housing permitting the housing to be held by hand such that a person can direct the camera to scan image phenomena with said camera as selected by said person.

12. The apparatus of claim 11 wherein the recording control means includes a switch located proximate the gripping means so that the switch can be operated by a hand holding the housing.

13. The apparatus of claim 2 wherein the buffer means comprises a random access memory.

14. The apparatus of claim 2 wherein the buffer means comprises a solid state memory.

15. The apparatus of claim 2 wherein the buffer means comprises a micro-electronic circuit.

16. The hand-held camera and recording apparatus of claim 1 further comprising transmission means for transmitting video picture signals played back from said video recording means to a remotely located display device.

17. A portable hand-held camera, recording and playback unit having its components supported within a single housing, comprising:

(a) a camera supported towards the front of the housing for generating video signals on an output thereof;

(b) a removable and rechargeable battery means for supplying energy to the unit and its components;

(c) video recording means for recording the video signals generated by the camera, the video recording means having an opening for receiving a cartridge of magnetic recording tape and including a motor driven mechanism including recording and reproduction heads for recording on and reproducing from the tape;

(d) display means supported by the housing and operatively connected to both the output of the camera means and the output of the video recording means for viewing eithere the video signals generated by the camera or video signals reproduced from the recording means;

(e) support means for enabling a user to hold and aim the unit to cause the camera to scan and generate video signals of a selected image;

(f) electrical coupling means for connecting an external source of electrical energy to the unit in the event that the battery is discharged or not employed;

(g) a microphone generally oriented towards the front of the housing for picking-up sounds to be recorded along with the video signals;

(h) audio recording means coupled to the microphone for recording on and playing back from the magnetic tape the audio signals generated by the microphone; and (i) an electronic control system for controlling the operation of the unit including:

(1) preview control means for causing the unit to operate in a preview mode by transmitting the output of the camera to the display means without also recording the output in the video recorder, thereby enabling the user to operate the unit to view the image scanned by the camera means before electing to record the image;

(2) recording control means for causing the unit to operate in a recording mode to transmit the output of the camera means and microphone to the video recording means to be recorded on the magnetic tape; and (3) playback control means for causing the unit to operate in a playback mode by controlling the video recording means to play back the video signals recorded on the tape and transmit them to the display means to be viewed by the user.

18. The portable camera and recording unit in accordance with claim 17 further comprising means for recording and reading digitial codes on the magnetic tape for locating video signals recorded thereon.

19. The portable camera and recording unit in accordance with claim 17 further comprising frame recording means for recording a single frame of video information derived from the camera.

20. The portable camera and recording unit in accordance with claim 19 wherein the frame recording means comprises:
   (a) a digital memory; and
   (b) analog-to-digital conversion means coupled to the camera for converting a single frame of video signals generated by the camera to a digital representation of an image scanned by the camera means; and
   (c) wherein the electronic control system includes still image control means for causing the conversion means to convert one frame of video signals from analog to digital form, and for storing the digital representation of the scanned image in the digital memory.

21. The portable camera and recording unit in accordance with claim 19 wherein the frame recording means further comprises means for recording a single frame of video information on the magnetic tape.

22. The portable camera and recording unit in accordance with claim 21 further comprising means for generating and recording on the magnetic tape a digital code associated with a single frame of video information.

23. The portable camera and recording unit in accordance with claim 22 further comprising means for searching the digital codes recorded on the magnetic tape to locate a selected previously-recorded single frame of video information.

24. The portable camera and recording unit in accordance with claim 19 further comprising means for selectively viewing on the display means the information stored in the digital memory.

25. The portable camera and recording unit in accordance with claim 17 further comprising connections to enable the video signals recorded on the tape to be played back on a monitor external to the housing.

26. A portable camera, recorder, monitor and playback system comprising:
   (a) a support housing including holding means enabling an operator to hold said support in a predetermined orientation,
   (b) a television camera mounted to said support and including an optical lens system directed in a first direction with respect to said support, and means for producing first video signals in response to light received from a scene toward which said optical lens system is directed and passed through said optical lens system,
   (c) a video cassette recording and reproducing system including rotary video transducer means mounted to said support and a receptacle arrangement enabling the reception and removal of a video cassette therefrom,
   (d) an electronically operated video display means having a display screen mounted to said support, said display means being responsive to video signals for displaying an image that can be viewed by said operator when the eyes of the operator are directed in said first direction,
   (e) a control circuit including: (1) first switch means for directing signals from the output of said camera to said display means and via frequency modulating means to said recording system, (2) second switch means for directing the output of said recording system via frequency demodulating means to said display means, and (3) preview means for applying video signals produced by said television camera to said electrically operated video display means without also recording said signals.

27. The apparatus of claim 26 wherein at least one of said switch means is located on said support housing proximate said holding means.

28. A portable combination camera, recorder, monitor and playback unit comprising:
   (a) a unitary housing,
   (b) a camera operably supported within said housing and having an electro-optical sensing means for sensing variations in image field light received thereby and generating video picture signals on an output thereof,
   (c) video recording means supported within said housing for recording video picture signals,
   (d) grip means secured to said housing and engageable by a hand of a person to cause said housing to be directed at a select image field so as to permit light from said image field to be sensed by said camera,
   (e) a rechargeable battery removeably coupled to said housing,
   (f) a video monitor supported by said housing and located to permit a person holding, directing and operating said camera to view images defined by video picture signals,
   (g) manually operable control means supported by said housing including a plurality of switches for selectively operating said unit in a plurality of modes, said control means including: (1) first switch means for connecting the video picture signals output by said camera to said video monitor to be viewed by said person holding said housing without also recording said video picture signals in said recording means; (2) second switch means for operating said video recording means to record said video picture signals output by said camera; and (3) third switch means for operating said video recording means in a playback mode to permit information recorded therein to be visually monitored by the person holding said housing.

29. The combination in accordance with claim 28 wherein said video recording means includes a magnetic recording device employing transducers and magnetic tape.

30. The combination in accordance with claim 28 wherein said video recording means includes a video cassette recorder.

31. The combination in accordance with claim 28 wherein at least one of said plurality of switches are accessible to the hand of the operator holding said grip means.

32. The combination in accordance with claim 28 further comprising a memory device for storing said video picture signals output by said camera.

33. The combination in accordance with claim 32 wherein said manually operable control means includes fourth switch means for causing said memory device to store at least a portion of one frame of video picture signals output by said camera and defining a still scanned by said camera.

34. The combination in accordance with claim 33 wherein said manually operable control means includes fifth switch means for causing said video recording device to record said video picture signals stored in said memory device and defining a still image scanned by said camera.

35. A portable combination camera, recorder, monitor and playback unit comprising:
(a) a unitary housing,
(b) a camera operably supported within said housing at one end thereof and having an electro-optical sensing means for sensing variations in image field light received thereby and generating video picture signals on an output of said camera,
(c) a video recording means supported within said housing adjacent said camera,
(d) receiving lens means at one end of said housing for receiving light from an image field and directing said light at said electro-optical sensing means of said camera,
(e) grip means secured to said housing and engageable by a hand of a person operating said unit to cause said housing to be hand held and directed at a select image field so as to permit light from said image field to be passed through said receiving lens means to said camera,
(f) a video monitor supported by said housing and located to permit a person holding, directing and operating said camera to view the image information output by said camera,
(g) a rechargeable battery removeably coupled to said housing, and means for operatively connecting said rechargeable battery to said camera, said video recording means and said video monitor, and
(h) manually operable control means supported by said housing including a plurality of manual switches for selectively operating said and said video recording means while said housing is manually directed at an image field, said control means including: (i) at least one switch for operating said unit in a preview mode to view, without recording, image information output by said camera, (ii) at least one switch for operating said unit in a recording mode to both view and record image information output by said camera, (iii) at least one switch for operating said unit in a still image mode to view and record a single frame of image information defining at least a portion of a still image scanned by said camera, and (iv) at least one switch for operating said unit in a playback mode to play back image information recorded in said video recording means.

36. The portable combination in accordance with claim 35 wherein said unitary housing is substantially rectangularly box-like in shape.

37. The portable combination in accordance with claim 35 wherein said video recording means comprises a video-cassette recorder employing a magnetic tape cartridge.

38. The portable combination in accordance with claim 35 wherein at least one of said manual switches is accessible to the hand of the person holding said grip means.

39. The combination in accordance with claim 35 wherein said video recording means includes an opening in a wall of said housing for receiving a magazine containing a magnetic tape recording member and guiding means for guiding said magazine to operatively locate said tape in said video recorder.

40. The combination in accordance with claim 35 wherein said video recording means is operable to record and reproduce video picture signals on magnetic tape and includes rotatably supported magnetic transducing means.

41. The combination in accordance with claim 40 wherein said video recording means is operable to record video signals output by said television camera on magnetic tape supplied from a tape cassette, and further including: (a) means for removing said magnetic tape from a cassette operatively located with respect to said magnetic transducing means and for operatively disposing said tape with respect to said rotatably supported magnetic transducing means, and (b) means for guiding said tape from said tape cassette and driving said tape against said transducing means as said transducing means is rotated to cause said magnetic transducing means to scan and record video signals from said camera along parallel tracks extending transverse to the longitudinal axis of said tape in helical scanning movement with respect to said tape.

42. The combination in accordance with claim 35 including means for connecting a source of externally generated electrical energy to said camera, said video recording means and said video monitor through said plurality of manual switches to permit said combination to be operated with electrical energy generated externally of said housing.

* * * * *